United States Patent
Harada et al.

(10) Patent No.: US 7,934,873 B2
(45) Date of Patent: May 3, 2011

(54) TAPERED ROLLER BEARING

(75) Inventors: Kazuyoshi Harada, Kuwana (JP); Tomoya Sakaguchi, Kuwana (JP)

(73) Assignee: NTN Corporation, Osaka (JP)

( * ) Notice: Subject to any disclaimer, the term of this patent is extended or adjusted under 35 U.S.C. 154(b) by 463 days.

(21) Appl. No.: 12/083,902

(22) PCT Filed: Aug. 7, 2006

(86) PCT No.: PCT/JP2006/315603
§ 371 (c)(1),
(2), (4) Date: Apr. 21, 2008

(87) PCT Pub. No.: WO2007/049389
PCT Pub. Date: May 3, 2007

(65) Prior Publication Data
US 2009/0162001 A1 Jun. 25, 2009

(30) Foreign Application Priority Data
Oct. 25, 2005 (JP) .................................. 2005-310190

(51) Int. Cl.
*F16C 19/50* (2006.01)
*F16C 33/46* (2006.01)
(52) U.S. Cl. ................... 384/571; 384/450; 384/565
(58) Field of Classification Search ............ 384/450, 384/470, 522–523, 551, 565, 571–572, 574
See application file for complete search history.

(56) References Cited

U.S. PATENT DOCUMENTS

| | | | | |
|---|---|---|---|---|
| 1,349,307 A * | 8/1920 | Winn | .................. | 384/571 |
| 1,795,471 A * | 3/1931 | Buckwalter | .................. | 384/564 |
| 5,711,738 A * | 1/1998 | Abe et al. | .................. | 475/246 |
| 6,238,095 B1 * | 5/2001 | Ai | .................. | 384/450 |
| 7,175,351 B2 * | 2/2007 | Ono et al. | .................. | 384/571 |
| 2005/0213861 A1 * | 9/2005 | Ono et al. | .................. | 384/571 |

FOREIGN PATENT DOCUMENTS

| | | |
|---|---|---|
| JP | 10-089352 A | 4/1998 |
| JP | 2003-028165 | 1/2003 |
| JP | 2005-16656 | 1/2005 |
| JP | 2005-188738 | 7/2005 |

OTHER PUBLICATIONS

European Search Report issued in European Patent Application No. EP 06782445.8 dated Feb. 2, 2010.
Sakaguchi, T., et al., "Three-dimensional Dynamics Analysis on Cage of Tapered Roller Bearing (Second Report, Calculation Result)," Proceeding of JAST Tribology Conference Tottori, Nov. 2004, p. 503-504, Japanese Society of Tribologists.
Muraki, M., et al., "Traction Characteristics of Lubricating Oils (2nd Report)," Lubrication, 1983, p. 753-760, vol. 28, No. 10.
Kragelskii, I.V., "Friction and Wear," 1965, p. 182-183, Butterworth Inc., Washington, D.C.

* cited by examiner

*Primary Examiner* — Marcus Charles
(74) *Attorney, Agent, or Firm* — McDermott Will & Emery LLP

(57) ABSTRACT

A tapered roller bearing includes bearing rings including an inner ring and an outer ring, a roller rolling between the inner ring and the outer ring, and a cage having a pocket holding the roller and located adjacent to the outer ring. A radial clearance $\delta$ between the cage and the outer ring when the cage is in a neutral position, a radial clearance $\delta_{pr}$ between the roller held in the pocket and the cage, and a circumferential clearance $\delta_{pc}$ between the roller held in the pocket and the cage satisfy relations $\delta_{pr} > \delta_{pc}$ and $-2 \leq (\delta - \delta_{pr})/(\delta_{pr} - \delta_{pc}) \leq 0$.

4 Claims, 4 Drawing Sheets

OUTER DIAMETER SIDE

INNER DIAMETER SIDE

US 7,934,873 B2

TAPERED ROLLER BEARING

RELATED APPLICATIONS

This application is the U.S. National Phase under 35 U.S.C. §371 of International Application No. PCT/JP2006/315603, filed on Aug. 7, 2006, which in turn claims the benefit of Japanese Application No. 2005-310190, filed on Oct. 25, 2005, the disclosures of which APPLICATIONS are incorporated by reference herein.

TECHNICAL FIELD

The present invention relates to a tapered roller bearing, and in particular to a tapered roller bearing allowing contact between a cage and a raceway surface.

BACKGROUND ART

In the field of rolling bearings, a method of increasing the number of rolling elements is generally known as a technique of improving load carrying capacity. When the number of rolling elements is increased, a circumferential interval between the rolling elements is reduced. In this regard, by increasing a diameter of a cage, the cage has a relatively wide circumferential width, and rigidity of the cage can be ensured. Therefore, from the viewpoint of improving the rigidity of the cage, it is desirable to minimize a clearance between the cage and a raceway surface (an outer ring/an inner ring).

A bearing allowing contact between a cage and a raceway surface of an outer ring during operation is disclosed, for example, in Japanese Patent Laying-Open No. 2005-188738 (Patent Document 1).

Patent Document 1: Japanese Patent Laying-Open No. 2005-188738

DISCLOSURE OF THE INVENTION

Problems to be Solved by the Invention

In a tapered roller bearing in which a cage comes into contact with a bearing ring during operation, interference between the cage and the bearing ring causes a change in a behavior of the cage, thereby causing a change in a pattern of interference between a roller and the cage. Accordingly, an interference force between the roller and the cage may be drastically increased, when compared to a tapered roller bearing in which a cage cannot come into contact with a bearing ring. This phenomenon is unfavorable from the viewpoint of ensuring the strength of the cage.

In this regard, Patent Document 1 does not disclose a lower limit of a clearance between a cage and a bearing ring.

The present invention has been made in view of the problems as described above, and one object of the present invention is to provide a tapered roller bearing suppressing an increase in an interference force between a roller and a cage.

Means for Solving the Problems

A tapered roller bearing in accordance with the present invention includes, in one aspect, bearing rings including an inner ring and an outer ring, a rolling element rolling between the inner ring and the outer ring, and a cage having a pocket holding the rolling element and located adjacent to the outer ring. A radial clearance $\delta$ between the cage and the outer ring when the cage is in a neutral position, a radial clearance $\delta_{pr}$ between the rolling element held in the pocket and the cage, and a circumferential clearance $\delta_{pc}$ between the rolling element held in the pocket and the cage satisfy relations $\delta_{pr} > \delta_{pc}$ and $-2 \leqq (\delta - \delta_{pr})/(\delta_{pr} - \delta_{pc}) \leqq 0$.

The tapered roller bearing in accordance with the present invention includes, in another aspect, bearing rings including an inner ring and an outer ring, a rolling element rolling between the inner ring and the outer ring, and a cage having a pocket holding the rolling element and located adjacent to the inner ring. A radial clearance $\delta$ between the cage and the inner ring when the cage is in a neutral position, a radial clearance $\delta_{pr}$ between the rolling element held in the pocket and the cage, and a circumferential clearance $\delta_{pc}$ between the rolling element held in the pocket and the cage satisfy relations $\delta_{pr} > \delta_{pc}$ and $-2 \leqq (\delta - \delta_{pr})/(\delta_{pr} - \delta_{pc}) \leqq 0$.

In the tapered roller bearing, an increase in an interference force between a roller and the cage is suppressed and reduction in life of the cage is prevented by satisfying the relations described above.

In the specification of the present application, "clearance $\delta$ between the cage and the outer ring/inner ring" refers to a minimum clearance between the cage and the outer ring/inner ring. The "neutral position" refers to a position at which the center of the cage coincides with a bearing axis under conditions (A) a rolling contact surface of the roller is in contact with a raceway surface of the inner ring, and (B) the rolling contact surface of the roller is in contact with a raceway surface of the outer ring, and (C) a large end face of the roller is in contact with a cone back face rib of the inner ring, and (D) the large end face of the roller is in contact with the pocket of the cage. Further, "radial clearance $\delta_{pr}$ and circumferential clearance $\delta_{pc}$ between the rolling element and the cage" refer to distances for which the cage can be moved in a radial direction and in a circumferential direction, respectively, when the outer ring, the inner ring, and one rolling element are fixed at positions satisfying the above conditions (A) to (D) and only the cage is moved in the radial direction, that is, in a direction toward the rolling element, and in the circumferential direction orthogonal to the radial direction.

In the tapered roller bearing described above, the cage is made of a metal as an example.

When the cage is made of a metal, the interference force between the roller and the cage is increased, when compared to a case where the cage is made of a resin. In this regard, in the tapered roller bearing described above, even when the cage is made of a metal, an increase in the interference force between the roller and the cage can be suppressed by satisfying the relations described above.

EFFECTS OF THE INVENTION

According to the present invention, in a tapered roller bearing, an increase in an interference force between a roller and a cage is suppressed and reduction in life of the cage is prevented.

Figure 1:
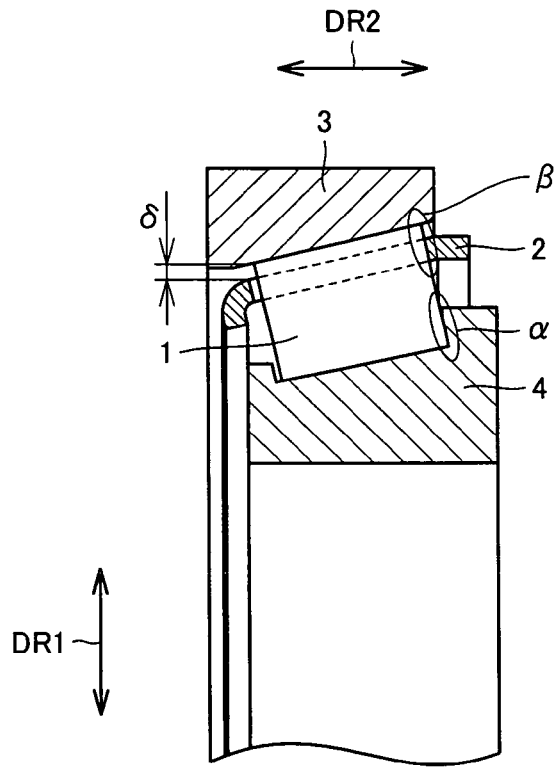
FIG. 1 is a cross sectional view showing a tapered roller bearing in accordance with a first embodiment of the present invention.

DESCRIPTION OF THE REFERENCE SIGNS 1 roller, 2 cage, 3 outer ring, 4 inner ring.

BEST MODES FOR CARRYING OUT THE INVENTION

Hereinafter, embodiments of a tapered roller bearing based on the present invention will be described. It is to be noted that identical or corresponding parts will be designated by the same reference numerals, and the description thereof may not be repeated.

First Embodiment

FIG. 1 is a cross sectional view showing a tapered roller bearing in accordance with a first embodiment. In FIG. 1, an arrow DR1 indicates a radial direction of the bearing, and an arrow DR2 indicates an axial direction of the bearing. Referring to FIG. 1, the tapered roller bearing in accordance with the present embodiment includes a roller 1 as a "rolling element", a cage 2 having a pocket holding roller 1, and an outer ring 3 and an inner ring 4 as "bearing rings". Roller 1 rolls between outer ring 3 and inner ring 4. Cage 2 is made of, for example, iron. Cage 2 is disposed adjacent to outer ring 3.

In FIG. 1, (A) a rolling contact surface of roller 1 is in contact with a raceway surface of inner ring 4, and (B) the rolling contact surface of roller 1 is in contact with a raceway surface of outer ring 3, and (C) a large end face of roller 1 is in contact with a cone back face rib of the inner ring (a portion a in FIG. 1), and (D) the large end face of roller 1 is in contact with the pocket of cage 2 on a larger diameter side (a portion P in FIG. 1).

When the center of the cage coincides with a bearing axis under a condition satisfying the above conditions (A) to (D), a radial clearance 6 is left between cage 2 and outer ring 3.

Figure 2:
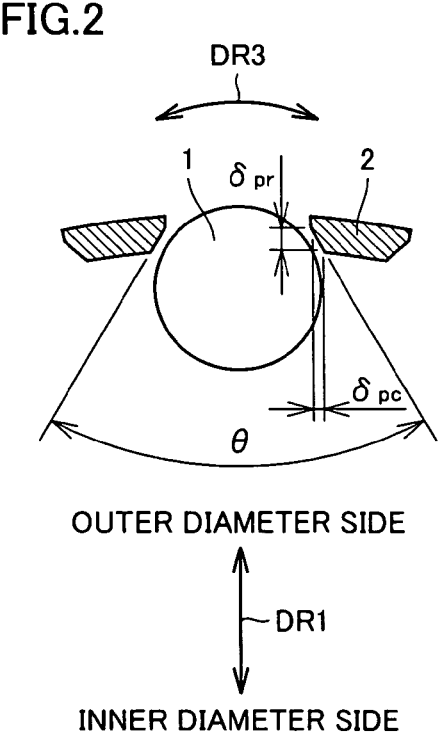
FIG. 2 is a view illustrating a clearance between a cage pocket and a rolling element in the tapered roller bearing shown in FIG. 1.

FIG. 2 is a view illustrating a clearance between the pocket of cage 2 and roller 1 in the tapered roller bearing shown in FIG. 1. In FIG. 2, an arrow DR3 indicates a circumferential direction of the bearing. Referring to FIG. 2, when the center of the cage coincides with the bearing axis under the condition satisfying the above conditions (A) to (D), a radial clearance $\delta_{pr}$ is left between cage 2 and roller 1 held in the pocket of cage 2, and a circumferential clearance $\delta_{pc}$ is left between cage 2 and roller 1 held in the pocket of cage 2. In an example of FIG. 2, $\delta_{pr}$ is greater than $\delta_{pc}$ (i.e., $\delta_{pr} > \delta_{pc}$). Further, the pocket of cage 2 has a window angle θ.

In the tapered roller bearing shown in FIGS. 1 and 2, when $\delta \leq \delta_{pr}$, cage 2 may come into contact with outer ring 3 during operation. As a result, there is a concern that an interference pattern of cage 2 may be changed, and an interference force between roller 1 and cage 2 may be drastically increased, when compared to a tapered roller bearing in which cage 2 cannot come into contact with outer ring 3. It is therefore important to consider to what extent the clearance between cage 2 and outer ring 3 can be reduced.

The inventors of the present application have defined a clearance ratio φ specified by $\phi = (\delta - \delta_{pr})/(\delta_{pr} - \delta_{pc})$, and determined the interference force between roller 1 and cage 2 by analysis, with the clearance ratio changed.

Figure 3:
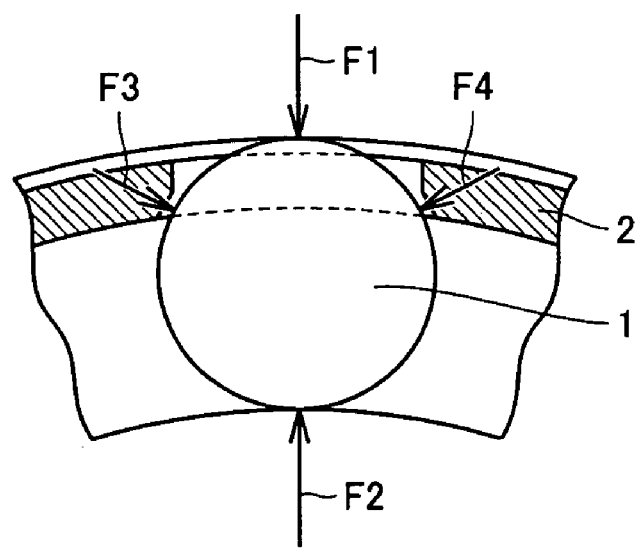
FIG. 3 is a first view illustrating an interference force considered in three-dimensional dynamics analysis.
Figure 4:
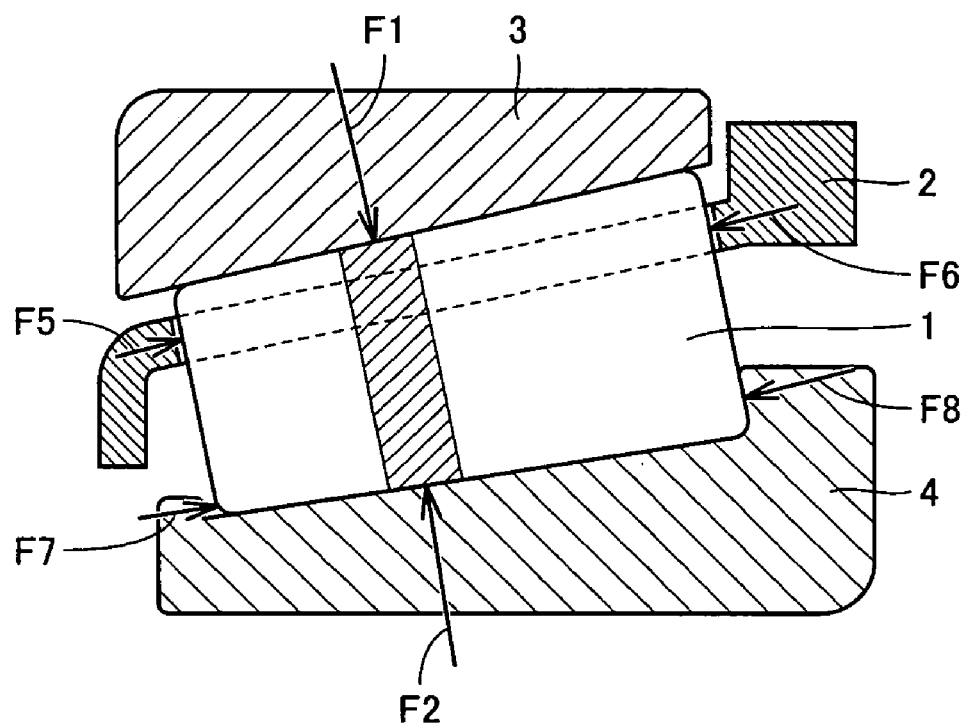
FIG. 4 is a second view illustrating the interference force considered in the three-dimensional dynamics analysis.

FIGS. 3 and 4 are views illustrating the interference force considered in three-dimensional dynamics analysis performed by the inventors of the present application.

The following conditions are assumed for the analysis:

Roller 1 and cage 2 are given six degrees of freedom.

Outer ring 3 is fixed in space.

Inner ring 4 is forcibly given rotation at a constant speed and translational displacement corresponding to a set load (the degree of freedom: 0).

All the apparent forces such as centrifugal force are included.

Gravity is taken into consideration.

Each element is considered as a rigid body, and local elastic contact between the elements is taken into consideration.

Distribution of the interference force on the rolling contact surface of roller 1 is evaluated by the slice method.

A traction coefficient $\mu_{hd}$ under hydrodynamic lubrication is given by a simplified theoretical formula of Muraki et al. (Muraki, Kimura: Lubrication, 28, 10(1983)753), under an isothermal condition.

A friction coefficient $\mu_{bd}$ under boundary lubrication is given by a formula (1) obtained by modifying a model of Kragelskii (Kragelskii, I. V., Friction and Wear, Butterworths (1965)).

$$\mu_{bd} = (-0.1 + 22.28\,s)\exp(-181.46\,s) + 0.1 \tag{1}$$

A tangential force coefficient with respect to a contact force between roller 1 and the raceway surface (F1, F2 in FIGS. 3 and 4) is given by formulas (2-1) to (2-3), taking a change in a lubrication regime into consideration. Further, under an EHL (Elastohydrodynamic Lubrication) condition, EHL rolling resistance is taken into consideration.

It is assumed that an interference force between the large end face of roller 1 and the cone back face rib of inner ring 4 (F8 in FIG. 4) is entirely exerted on the maximum interference point. A tangential force coefficient is given by the formulas (2-1) to (2-3).

$$\mu_r = \mu_{bd}\,(A<0.01) \tag{2-1}$$

$$\mu_r = \{(\mu_{bd} - \mu_{hd})/0.01 - 1.5)^6\} \times (A - 1.5)^6 + \mu_{hd}\,(0.01 \leq A < 1.5) \tag{2-2}$$

$$\mu_r = \mu_{hd}\,(1.5 \leq A) \tag{2-3},$$

where $\mu_r$ is a tangential force coefficient, and A is an oil film parameter.

It is assumed that a tangential force coefficient with respect to a contact force between roller 1 and cage 2 (F3-F6 in FIGS. 3 and 4) is given only under boundary lubrication.

As to contact of a retaining rib and a pocket surface with an end surface of the roller (F5-F7 in FIG. 4), all the contact forces and tangential forces are exerted on the maximum interference point.

Figure 5:
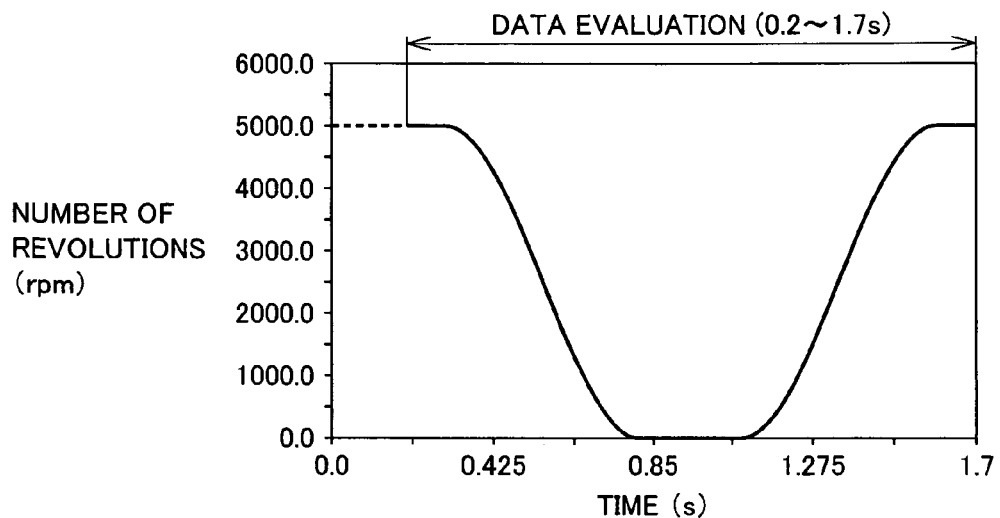
FIG. 5 is a view showing a change in a rotational speed of an inner ring in the three-dimensional dynamics analysis.

Table 1 shows a bearing subjected to the analysis and operating conditions. FIG. 5 shows a change in a rotational speed of the inner ring in the analysis.

TABLE 1

| | |
|---|---|
| bearing (inner diameter × outer diameter × width, mm) | φ40 × φ76 × 17.5 |
| oil temperature (° C.) | 100 |
| kinetic viscosity of lubricant (mm²/s) {cSt} | 2.520 @ 100° C. |
| rotational speed of inner ring (rpm) | 5000 → 10 → 5000 |
| radial load (kN) | 5 |
| axial load (kN) | 1.7 |

As described above, in the tapered roller bearing described above, when $\delta \leq \delta_{pr}$, cage 2 may come into contact with the raceway surface of outer ring 3 while the bearing is in operation. Therefore, under the condition of $\delta_{pr} > \delta_{pc}$, when $\phi \leq 0$, cage 2 may come into contact with the raceway surface of outer ring 3 while the bearing is in operation. Further, as $\phi$ decreases, the degree of interference between cage 2 and the raceway surface of outer ring 3 increases.

Figure 6:
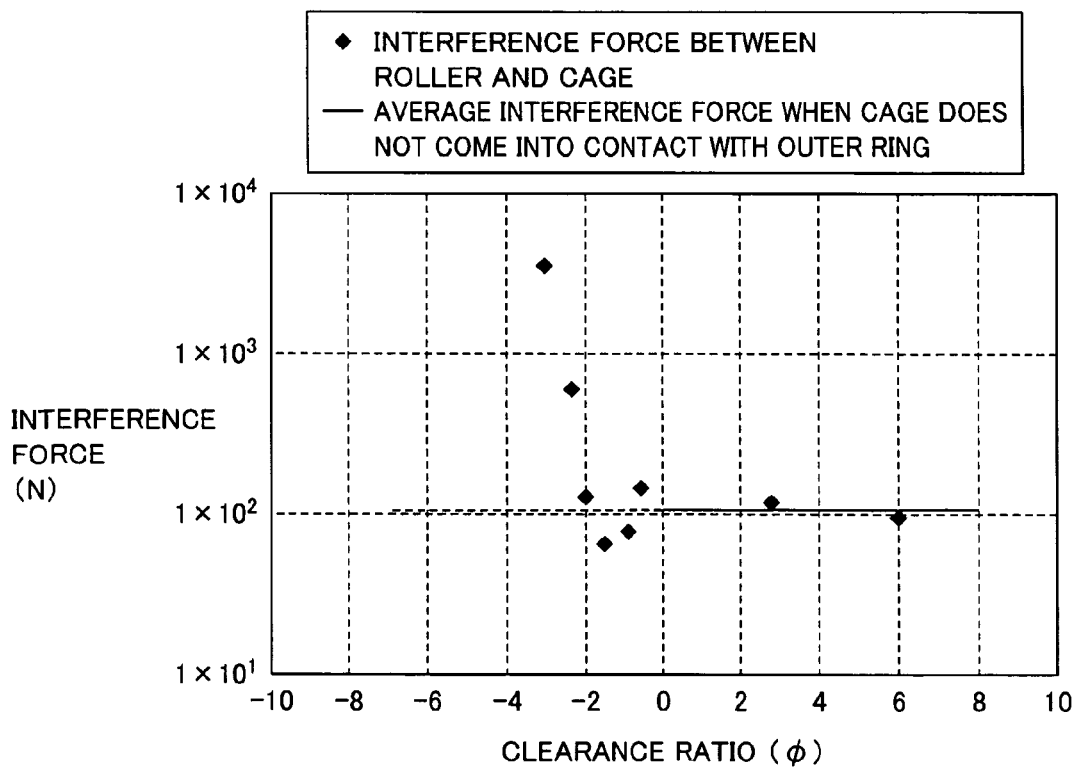
FIG. 6 is a view showing the relation between a clearance ratio 4 and an interference force between a roller and the cage obtained by the three-dimensional dynamics analysis.

FIG. 6 shows an analysis result of the three-dimensional dynamics analysis described above. FIG. 6 shows the relation between clearance ratio $\phi$ and the interference force between roller 1 and cage 2. Referring to FIG. 6, in a range of $\phi > 0$ in which cage 2 cannot come into contact with a raceway surface of outer ring 3 while the bearing is in operation, there is no significant change in the interference force between roller 1 and cage 2. In a range of $-2 \leq \phi \leq 0$ ($\phi = -0.5, -1.0, -1.5, -2.0$), the interference force between roller 1 and cage 2 is slightly reduced, when compared to that in the range of $\phi > 0$. In a range of $\phi < -2$, the interference force between roller 1 and cage 2 is increased. Therefore, in the tapered roller bearing in which cage 2 may come into contact with roller 1 while the bearing is in operation ($\phi \leq 0$), a rapid increase in the interference force between roller 1 and cage 2 can be suppressed by setting $\phi$ as $\phi \leq -2$.

The above description can be summarized as follows. Specifically, the tapered roller bearing in accordance with the present embodiment includes bearing rings including inner ring 4 and outer ring 3, roller 1 rolling between inner ring 4 and outer ring 3, and cage 2 having a pocket holding roller 1 and located adjacent to outer ring 3. Radial clearance δ between cage 2 and outer ring 3 when cage 2 is in a neutral position, radial clearance $\delta_{pr}$ between roller 1 held in the pocket and cage 2, and circumferential clearance $\delta_{pc}$ between the roller 1 held in the pocket and cage 2 satisfy relations $\delta_{pr} > \delta_{pc}$ and $-2 \leq (\delta - \delta_{pr})/(\delta_{pr} - \delta_{pc}) \leq 0$.

In the present embodiment, the description has been given on a tapered roller bearing in which a portion of cage 2 facing roller 1 is formed in a planar shape. The portion may be formed in a curved surface shape. Even when there is a change in the cross sectional shape of cage 2, an effect similar to that described above can be obtained by specifying the range of clearance ratio $\phi$.

In the above analysis, it is assumed that cage 2 is made of a metal (iron). When cage 2 is made of a resin, a critical value at which the interference force between roller 1 and cage 2 is drastically changed is considered to be slightly smaller than $\phi = -2$.

Second Embodiment

Figure 7:
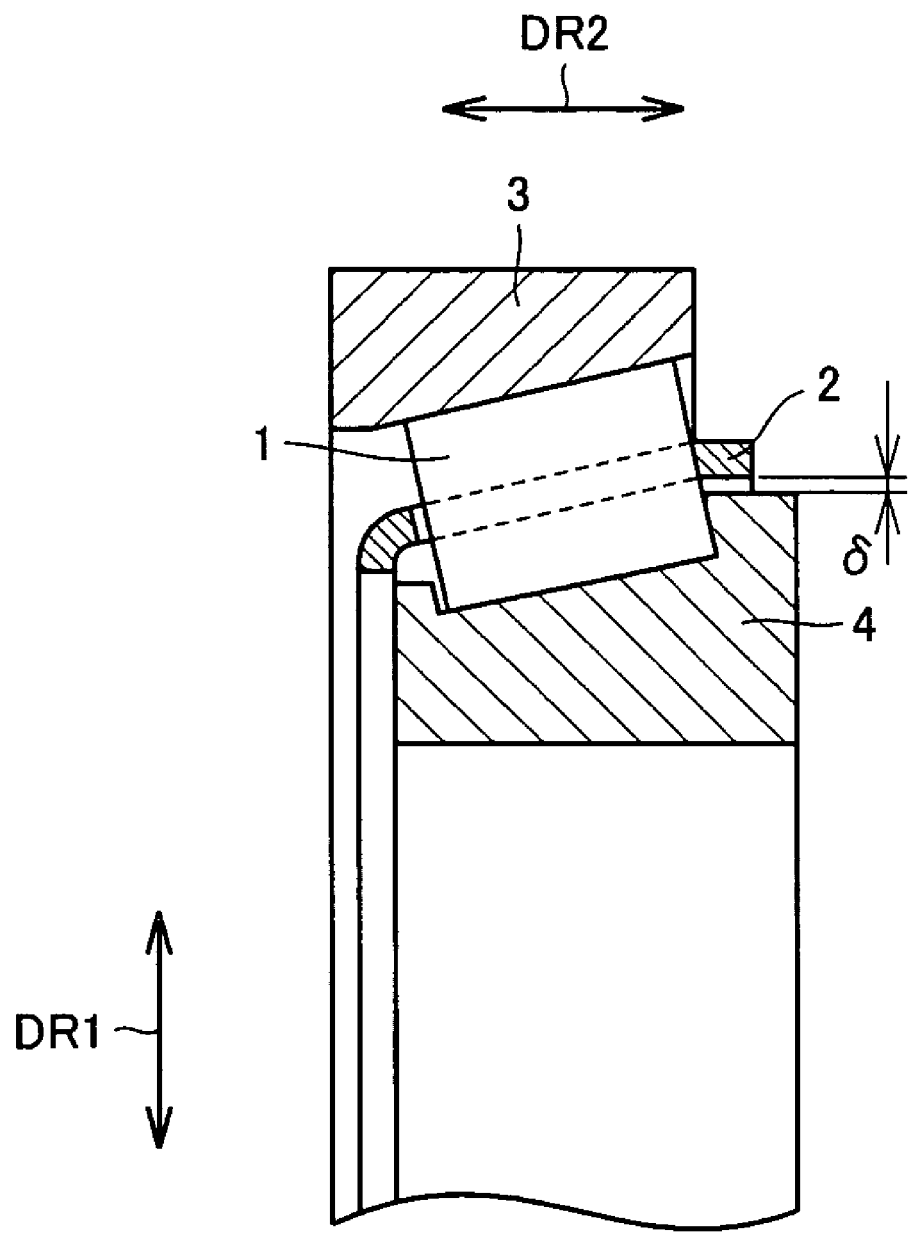
FIG. 7 is a cross sectional view showing a tapered roller bearing in accordance with a second embodiment of the present invention.

FIG. 7 is a cross sectional view showing a tapered roller bearing in accordance with a second embodiment. Referring to FIG. 7, the tapered roller bearing in accordance with the present embodiment is a variation of the tapered roller bearing in accordance with the first embodiment, characterized in that cage 2 is located adjacent to inner ring 4. In this case, there is a concern that cage 2 may come into contact with inner ring 4, and thereby a pattern of interference between roller 1 and cage 2 may be changed and the interference force between roller 1 and cage 2 may be increased.

Also in the present embodiment, even when cage 2 may come into contact with inner ring 4 while the bearing is in operation, an increase in the interference force between roller 1 and cage 2 can be suppressed by specifying the range of clearance ratio 4, as in the first embodiment. Specifically, the tapered roller bearing in accordance with the present embodiment includes bearing rings including inner ring 4 and outer ring 3, roller 1 rolling between inner ring 4 and outer ring 3, and cage 2 having a pocket holding roller 1 and located adjacent to inner ring 4. Radial clearance 6 between cage 2 and inner ring 4 when cage 2 is in a neutral position, radial clearance $\delta_{pr}$ between roller 1 held in the pocket and cage 2, and circumferential clearance $\delta_{pc}$ between roller 1 held in the pocket and cage 2 satisfy relations $\delta_{pr} > \delta_{pc}$ and $-2 \leq (\delta - \delta_{pr})/(\delta_{pr} - \delta_{pc}) \leq 0$.

While the embodiments of the present invention have been described, it should be understood that the embodiments herein disclosed are by way of illustration in all respects and not to be taken by way of limitation. The scope of the present invention is defined by the appended claims, and is intended to include all the modifications within the meaning and the scope equivalent to those of the claims.

The invention claimed is:

1. A tapered roller bearing, comprising:
   bearing rings including an inner ring and an outer ring;
   a rolling element rolling between said inner ring and said outer ring; and
   a cage having a pocket holding said rolling element and located adjacent to said outer ring,
   wherein a radial clearance δ between said cage and said outer ring when said cage is in a neutral position, a radial clearance $\delta_{pr}$ between said rolling element held in said pocket and said cage, and a circumferential clearance $\delta_{pc}$ between said rolling element held in said pocket and said cage satisfy relations $\delta_{pr} > \delta_{pc}$ and $-2 \leq (\delta - \delta_{pr})/(\delta_{pr} - \delta_{pc}) \leq 0$.

2. The tapered roller bearing according to claim 1, wherein said cage is made of a metal.

3. A tapered roller bearing, comprising:
   bearing rings including an inner ring and an outer ring;
   a rolling element rolling between said inner ring and said outer ring; and
   a cage having a pocket holding said rolling element and located adjacent to said inner ring,
   wherein a radial clearance δ between said cage and said inner ring when said cage is in a neutral position, a radial clearance $\delta_{pr}$ between said rolling element held in said pocket and said cage, and a circumferential clearance $\delta_{pc}$ between said rolling element held in said pocket and said cage satisfy relations $\delta_{pr} > \delta_{pc}$ and $-2 \leq (\delta - \delta_{pr})/(\delta_{pr} - \delta_{pc}) \leq 0$.

4. The tapered roller bearing according to claim 3, wherein said cage is made of a metal.

* * * * *